(12) United States Patent
Wobben

(10) Patent No.: US 6,906,431 B2
(45) Date of Patent: Jun. 14, 2005

(54) WIND POWER SYSTEM FOR DELIVERING CONSTANT APPARENT POWER

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 27 days.

(21) Appl. No.: 10/432,972

(22) PCT Filed: Nov. 15, 2001

(86) PCT No.: PCT/EP01/13203
§ 371 (c)(1),
(2), (4) Date: Oct. 2, 2003

(87) PCT Pub. No.: WO02/44560
PCT Pub. Date: Jun. 6, 2002

(65) Prior Publication Data
US 2004/0027095 A1 Feb. 12, 2004

(30) Foreign Application Priority Data
Nov. 28, 2000 (DE) .......................................... 100 59 018

(51) Int. Cl.$^7$ ................................................. F03D 9/00
(52) U.S. Cl. .............................. 290/44; 290/55; 322/17; 323/207
(58) Field of Search ....................... 290/44, 55; 322/17; 323/207; 363/37

(56) References Cited

U.S. PATENT DOCUMENTS

| | | | | |
|---|---|---|---|---|
| 3,829,759 A | * | 8/1974 | Thorborg .................... 323/207 |
| 3,959,719 A | * | 5/1976 | Espelage .................... 323/207 |
| 4,348,631 A | * | 9/1982 | Gyugyi et al. ............... 323/211 |
| 4,780,660 A | * | 10/1988 | Shima et al. ................ 323/207 |
| 5,083,039 A | * | 1/1992 | Richardson et al. .......... 290/44 |
| 5,187,427 A | | 2/1993 | Erdman ....................... 323/207 |
| 5,225,712 A | | 7/1993 | Erdman ....................... 290/44 |
| 5,302,906 A | * | 4/1994 | Lerch ......................... 324/650 |
| 5,798,631 A | * | 8/1998 | Spee et al. .................... 322/25 |
| 5,798,632 A | * | 8/1998 | Muljadi ....................... 322/29 |
| 6,072,302 A | * | 6/2000 | Underwood et al. .......... 322/17 |
| 6,256,212 B1 | * | 7/2001 | Wobben ....................... 363/40 |
| 6,437,996 B1 | * | 8/2002 | Wobben ....................... 363/37 |
| 6,703,718 B2 | * | 3/2004 | Calley et al. ................. 290/44 |
| 6,825,640 B1 | * | 11/2004 | Hill et al. ...................... 322/46 |

FOREIGN PATENT DOCUMENTS

| | | |
|---|---|---|
| DE | 44 23 033 A1 | 1/1996 |
| DE | 296 21 449 U1 | 2/1997 |
| DE | 196 05 419 A1 | 8/1997 |
| DE | 19729034 A1 * | 1/1999 ........... F03D/11/04 |
| DE | 197 56 777 A1 | 7/1999 |
| DE | 100 19 362 A1 | 10/2001 |
| JP | 2000-078896 | 3/2000 |
| WO | WO 01/73518 A1 | 10/2001 |

OTHER PUBLICATIONS

Carlin, P., "An Investigation of the Interaction of a Wind Farm and a Hawaiian Utility Line," in Proceedings of the 25$^{th}$ Intersociety, Energy Conversion Engineering Conference, IECEC, [Online], Aug. 12–17, 1990, pp. 202–206, retrieved from the internet on Apr. 8, 2002, from <URL: http://ieeexplore.ieee.org/ie14/5796/16147/00747951.pdf>.

* cited by examiner

Primary Examiner—Joseph Waks
(74) Attorney, Agent, or Firm—Seed IP Law Group PLLC

(57) ABSTRACT

A wind power facility having a plurality of wind power installations, the wind power installations connected to a current voltage network into which the electrical current generated is fed or delivered that, independent of the currently prevailing amount of wind and the active power that is thus available from the wind power installation, a constant apparent power is always delivered into the network. A device for regulating the power to be delivered to a current voltage network is provided so that the regulation is so adjusted to have a constant apparent power always fed to the network.

16 Claims, 2 Drawing Sheets

WIND POWER SYSTEM FOR DELIVERING CONSTANT APPARENT POWER

BACKGROUND OF THE INVENTION

1. Field of the Invention

The present invention pertains to a wind power installation and, more particularly, to a wind park comprising a plurality of wind power installations configured to generate constant apparent power.

2. Description of the Related Art

Wind power installations, such as a wind park consisting of wind power generators, are usually connected to a current voltage network into which the electrical current generated is fed or delivered.

The particularity of the current feed in the case of wind power installations is that the greatly fluctuating wind conditions mean that the power of the wind that is fed in also correspondingly fluctuates. This differs greatly in relation to other energy generators, such as atomic power stations, water power stations, coal-fired or natural gas-fired power stations, in which admittedly fluctuations can possibly also be found over prolonged periods of time but which do not involve power fluctuations for relatively short periods of time. Therefore atomic power stations, water power stations, natural gas-fired power stations and so forth are rather used to furnish the basic load of a network while it is only in areas with continual wind that wind power installations are in a position also to provide a basic current load.

Therefore, wherever wind power installations that provide in particular a greatly fluctuating feed of power are connected to the network, the electricity supply utility (ESU) also often has to implement a stabilising or supporting measure for the network as there is a wish on the part of the ESU that there are no current and voltage fluctuations in the network.

SUMMARY OF THE INVENTION

The disclosed embodiment of the invention provides that, independent of the currently prevailing amount of wind and the active power which is thus available from the wind power installation, a wind power installation or a wind park comprising a plurality of wind power installations always delivers a constant apparent power into the network.

That apparent power is calculated in accordance with the following formula:

$$S=\sqrt{P^2+Q^2}$$

wherein S is the apparent power, P is the active power, and Q is the reactive power. Accordingly, if the available active power rises because of a corresponding amount of wind, the proportion of reactive power is also correspondingly reduced. That relationship can be seen in greater detail in accompanying FIGS. 1 and 2.

The advantage of the invention lies in a stabilizing or supporting action on the current supply network. If little active power is available, for example as a consequence of the wind being low, the quality of the network can be improved by the provision of reactive power. That in turn affords reduced voltage fluctuations which moreover can certainly mean that the delivery of electrical energy into the network has to be reduced if the voltage in the network reaches an upper limit value. The respective proportion of reactive power can be so adjusted that it is capacitive or inductive.

If there is sufficient active power, it is delivered to the network and supports the network in the event of a fluctuating power demand. The remaining proportion of reactive power can in turn be delivered in a known manner as inductive or capacitive reactive power.

Flexible adjustment of the power gradient (dP/dt) permits adaptation to the reception capability of the network in relation to rapid changes in power. Even in a network with dominant wind power, the described apparent power management can already be taken into account in the planning phase, in particular in relation to necessary network reinforcement measures in order to implement cost-reducing effects.

In accordance with one embodiment of the invention, a wind power system for delivering power to a network is provided. The system includes a plurality of wind power installations having a device for regulating the power to be delivered to the network, the regulation adjusted so that a constant apparent power is always fed to the network. Ideally, the apparent power is calculated in accordance with the following formula:

$$S=\sqrt{P^2+Q^2}$$

where S is the magnitude of the apparent power, P is the magnitude of the active power, and Q is the magnitude of the reactive power.

In accordance with another aspect of the foregoing embodiment, the device for regulating the power comprises a rectifier coupled to the wind power installations, a frequency converter coupled to the rectifier and controlled by a microprocessor coupled thereto.

In accordance with another embodiment of the invention, a wind park for delivering electric power to a network is provided that includes at least one wind power generator configured to generate electric power in response to wind; a reactive power supply to supply reactive power; and a regulating device coupled to the at least one wind power generator and to the reactive power supply and configured to supply constant apparent power to the network.

In accordance with another aspect of the foregoing embodiment, the regulating device includes a rectifier coupled to the at least one wind power generator, a frequency converter coupled to an output of the rectifier, and a microprocessor coupled to an output of the frequency converter and having an output coupled to a control input of the frequency converter to regulate reactive power in reciprocal relationship with the active power.

In accordance with another aspect of the foregoing embodiment, the regulating device is configured to combine active power and reactive power to increase total power output to the network in response to network demand for increased total power.

In accordance with yet a further aspect of the foregoing embodiment, the reactive power supply comprises one of either a capacitive power supply and an inductive power supply.

In accordance with another embodiment of the invention, a method of supplying constant apparent power to a network coupled to a wind power installation having at least one wind-powered generator is provided. The method includes configuring the at least one wind-powered generator to generate electric power in response to wind; rectifying the electric power into dc voltage; converting the dc voltage into ac voltage; supplying reactive power; and regulating the active power and reactive power to output a constant apparent power to the network.

In accordance with an aspect of the foregoing embodiment, the reactive power is regulated in reciprocal relationship with the active power to achieve the constant apparent power. Ideally, the active power and the reactive power are regulated in accordance with the following formula:

$$S=\sqrt{P^2+Q^2}$$

where S is the magnitude of the apparent power, P is the magnitude of the active power, and Q is the magnitude of the reactive power.

In accordance with another aspect of the present invention, a device for regulating voltage delivered to a network from a wind power installation is provided, the device including a rectifier coupled to the wind power installation, a frequency converter coupled to the rectifier, and a microprocessor coupled to the output of the frequency converter and having an output coupled to a control input of the frequency converter to regulate generated active power and reactive power from a reactive power supply to output a constant apparent power to the network.

It is possible with the embodiment of the present invention that not only can the wind acting on a wind power installation be used in the optimum manner and converted into electrical energy, but in that respect networks are also not only operated in a fault-free manner they are also supported in terms of their operational efficiency. Therefore, overall increases in the quality standard of the current fed into the network or the entire wind power installation, which also actively contributes to the network quality, is realized. This is made possible by the wind power installation apparent power regulation in accordance with the invention.

BRIEF DESCRIPTION OF THE DRAWINGS

The invention is described in greater detail hereinafter by means of an embodiment with reference to the drawings in which.

DETAILED DESCRIPTION OF THE INVENTION

Figure 1:
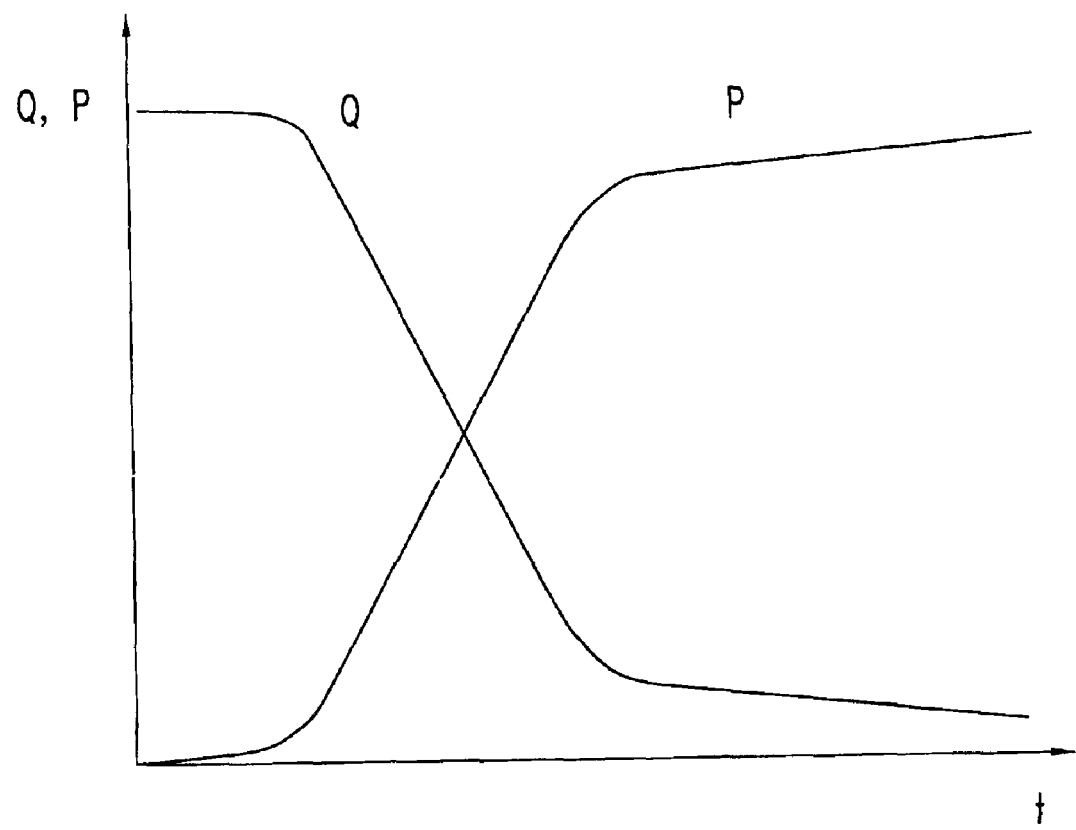
FIG. 1 shows a reactive power/active power time diagram of a control of a wind power installation.

FIG. 1 shows a reactive power/active power time diagram of a regulation in accordance with a wind power installation according to the invention. Therein P denotes the active power and Q the reactive power.

As can be seen from the diagram, the values in respect of the active power and also in respect of the reactive power behave in reciprocal relationship with each other. That is to say, with a rising active power the reactive power falls and vice-versa.

The sum of the squares of active power and reactive power is constant in that case.

Figure 2:
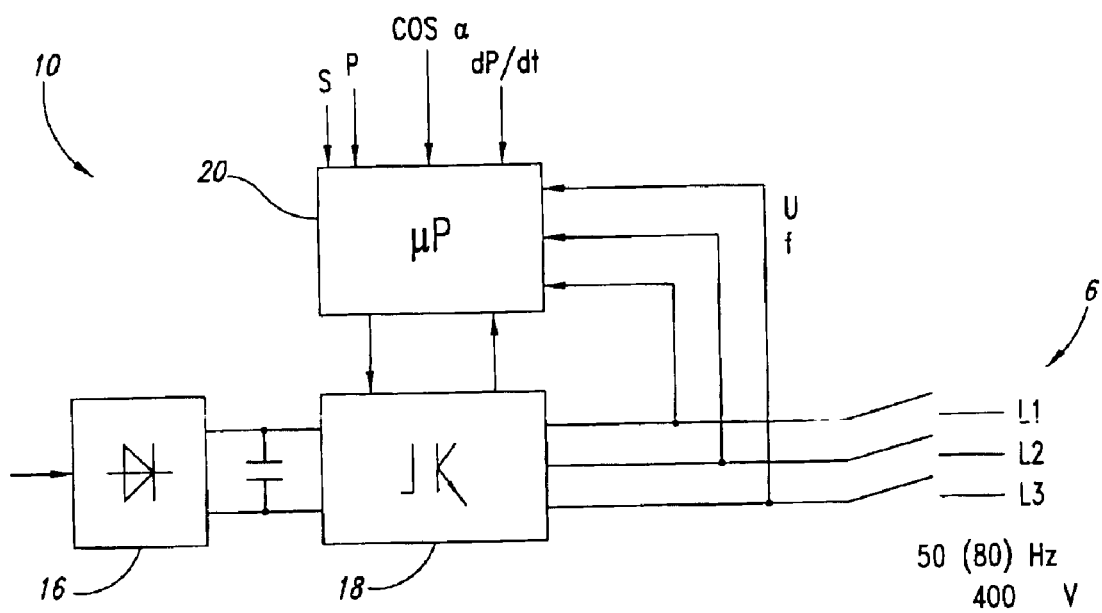
FIG. 2 is a view of a block circuit diagram of a regulating device used in a wind power installation.

FIG. 2 shows a regulating device 10 for implementation of the control according to the invention of a wind power installation. The control regulating device of the wind power installation firstly has a rectifier 16 in which the ac voltage generated in the generator of the wind power installation is rectified (dc voltage intermediate circuit). A frequency converter 18 connected to the rectifier 16 converts the dc voltage, which is initially the same in the intermediate circuit, into an ac voltage that is fed into the network 6 in the form of a three-phase ac voltage, by way of the lines L1, L2 and L3. The frequency converter 18 is controlled by means of a microcomputer 20, which is part of the overall regulating device 10. For that purpose, the microprocessor 20 is coupled to the frequency converter 18. The input parameters for regulation of the voltage and also the phase and the current position, with which the electrical energy available from the wind power installation is fed into the network, are the apparent power S, the electrical power P of the generator, the reactive power factor cos__ and the power gradient dP/dt. Depending on the respective active power generated, the reactive power supply is also adjusted, with a predetermined apparent power in accordance with the following formula:

$$S=\sqrt{P^2+Q^2}.$$

It will be appreciated that it is also possible, if necessary, to alter the operating mode if, for example, it is to be provided that the active power or reactive power is not to exceed a given value. If, for example, the ESU of the connected network requires that a given amount of reactive power is always fed into the network, this must be taken into consideration by suitable regulation. The consequence of the feed in accordance with the invention of a constant apparent power into an energy supply network or the supply of the feed of a constant apparent power into the energy supply network is that, with a fluctuating active power, the reactive power is correspondingly regulated—in reciprocal relationship with the active power—in such a way that a constant apparent power is achieved.

In order still to be able to intervene in the network with a constant apparent power, naturally the active power generated by the wind power installation can also be specifically reduced (for example by pitch control of the rotor blades) in order to feed into the network a higher (capacitive or also inductive) proportion of reactive power from the reactive power supply. Such a measure means that the network can still be correspondingly positively influenced, even with a theoretically higher available active power.

In regard to the invention in accordance with the present application it provides not only keeping the voltage constant, but it influences the network voltage, in accordance with the wishes of the network operator. Thus, by supplementing the active power proportion with a reactive power proportion, it is possible to raise the voltage level in the network to a desired value. It will be appreciated that those effects are inter alia also dependent on the topology of the network. In the case of a high demand for reactive power in the proximity of the wind power installation, however, that reactive power does not have to be transported through the network over long distances with corresponding losses. Rather, it can be furnished relatively close to the consumer by the wind power installation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A wind power system for delivering power to a network, comprising:

a plurality of wind power installations having a device for regulating the power to be delivered to the network, wherein the regulation is so adjusted that a constant apparent power is always fed to the network.

2. The wind power system of claim 1 wherein the apparent power is calculated in accordance with the following formula:

$$S=\sqrt{P^2+Q^2}$$

where

S is the magnitude of the apparent power,

P is the magnitude of the active power, and

Q is the magnitude of the reactive power.

3. The wind power system of claim 2 wherein the device for regulating the power comprises a rectifier coupled to the wind power installations, a frequency converter coupled to the rectifier and controlled by a microprocessor coupled thereto.

4. A wind park for delivering electric power to a network, comprising:

at least one wind power generator configured to generate active power in response to wind;

a reactive power supply; and a regulating device coupled to the at least wind power generator and the reactive power supply for supplying constant apparent power to the network.

5. The wind park of claim 4 wherein the regulating device is configured to supply constant apparent power to the network in accordance with the following formula:

$$S=\sqrt{P^2+Q^2}$$

where

S is the magnitude of the constant apparent power,

P is the magnitude of the active power, and

Q is the magnitude of reactive power.

6. The wind park of claim 5 wherein the regulating device comprises a rectifier coupled to the at least one wind power generator, a frequency converter coupled to an output of the rectifier, and a microprocessor coupled to an output of the frequency converter and having an output coupled to a control input of the frequency converter, the microprocessor configured to regulate reactive power in reciprocal relationship with the active power.

7. The wind park of claim 6 wherein the regulating device is further configured to combine active power and reactive power to increase total power output to the network in response to network demand for increased total power.

8. The wind park of claim 4 wherein the reactive power supply comprises a capacitive power supply.

9. The wind park of claim 4 wherein the reactive power supply comprises an inductive power supply.

10. A method of supplying constant apparent power to a network coupled to a wind power installation having at least one wind-powered generator, the method comprising:

configuring the at least one wind-powered generator to generate active power in response to wind;

rectifying the active power from the at least one wind-powered generator;

converting the rectified power;

supplying reactive power; and regulating the active power and the reactive power to output a constant apparent power to the network.

11. The method of claim 10 wherein the reactive power is regulated in reciprocal relationship with the active power to achieve the constant apparent power.

12. The method of claim 10 wherein the active power and the reactive power are regulated in accordance with the following formula:

$$S=\sqrt{P^2+Q^2}$$

where

S is the magnitude of the apparent power,

P is the magnitude of the active power, and

Q is the magnitude of the reactive power.

13. The method of claim 10 wherein regulating further comprises combining active power and reactive power to increase total power output to the network in response to network demand for increased total power.

14. A device for regulating power generated from a wind power installation for delivery to a network, the device comprising:

a rectifier coupled to the wind power installation to receive power generated in response to wind and to output dc voltage;

a frequency converter coupled to the rectifier and configured to receive the dc voltage from the rectifier and to convert the dc voltage into an ac voltage that is output to the network; and a control device coupled to the output of the frequency converter and having an output coupled to a control input of the frequency converter, the control device configured to regulate the frequency converter to output constant apparent power to the network that comprises active power from the dc voltage at the rectifier output with reactive power from a reactive power supply in accordance with the following formula:

$$S=\sqrt{P^2+Q^2}$$

where

S is the magnitude of the apparent power;

P is the magnitude of the active power, and

Q is the magnitude of the reactive power.

15. The device of claim 14 wherein the control device comprises a microprocessor configured to regulate voltage supplied to the network as well as current and phase in response to inputs comprising the apparent power S, the active power P, a reactive power factor, and a power gradient dP/dT.

16. The device of claim 14 wherein the control device is configured to combine active power and reactive power to increase total output voltage to the network in response to network demands for increased total voltage output.

* * * * *